March 2, 1971   B. A. BENSON   3,567,348
SCREW PUMP PROVIDED WITH A RADIALLY MOVABLE ROTOR COUPLING
Filed April 23, 1969   6 Sheets-Sheet 3

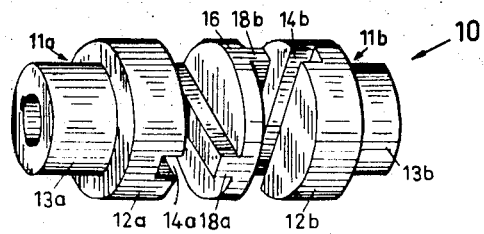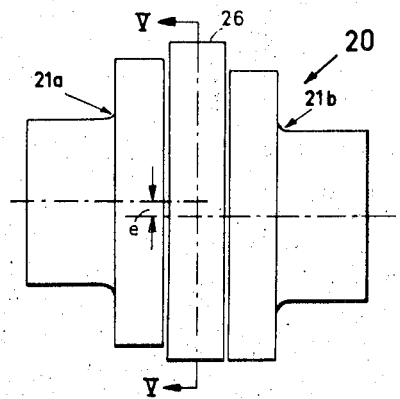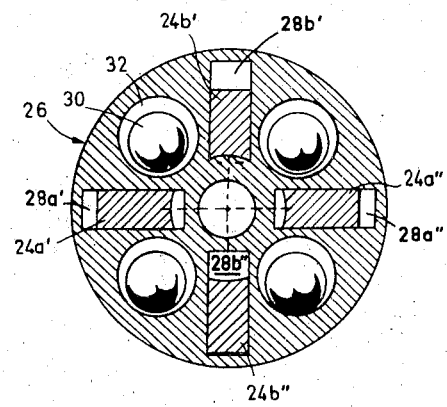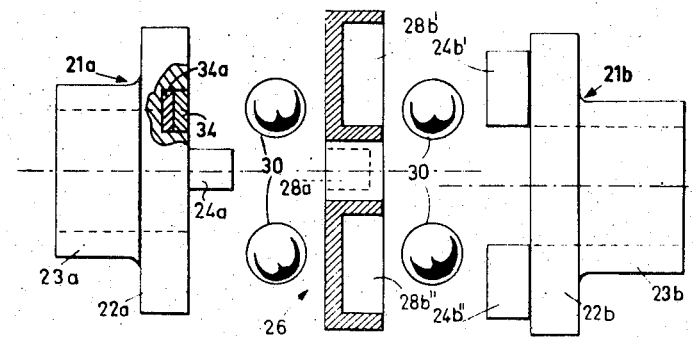

INVENTOR
BENGT ANDERS BENSON
BY
Woodhams, Blanchard & Flynn
ATTORNEYS

March 2, 1971  B. A. BENSON  3,567,348
SCREW PUMP PROVIDED WITH A RADIALLY MOVABLE ROTOR COUPLING
Filed April 23, 1969  6 Sheets-Sheet 4

INVENTOR
BENGT ANDERS BENSON
BY
Woodhams, Blanchard & Flynn
ATTORNEYS

March 2, 1971   B. A. BENSON   3,567,348
SCREW PUMP PROVIDED WITH A RADIALLY MOVABLE ROTOR COUPLING
Filed April 23, 1969   6 Sheets-Sheet 5

INVENTOR
BENGT ANDERS BENSON
BY
Woodhams, Blanchard and Flynn
ATTORNEYS

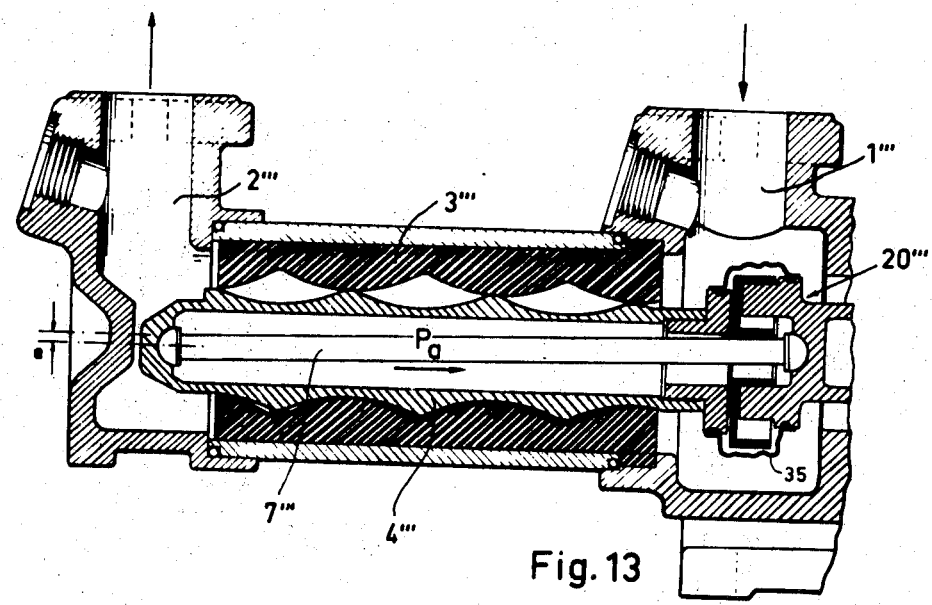
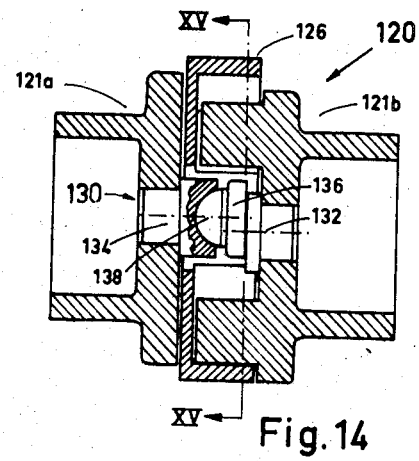 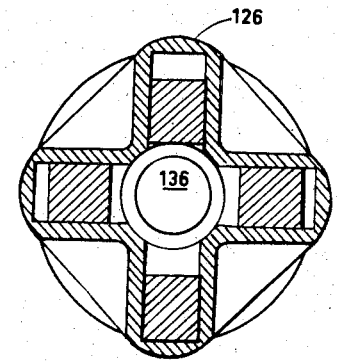

United States Patent Office 3,567,348
Patented Mar. 2, 1971

3,567,348
SCREW PUMP PROVIDED WITH A RADIALLY MOVABLE ROTOR COUPLING
Bengt A. Benson, Stockholm, Sweden, assignor to Stenberg-Flygt Aktiebolaget, Solna, Sweden
Filed Apr. 23, 1969, Ser. No. 818,719
Claims priority, application Sweden, Apr. 29, 1968, 5,776/68
Int. Cl. F01c 1/10, 5/00; F04c 1/06
U.S. Cl. 418—48                                    9 Claims

ABSTRACT OF THE DISCLOSURE

There is provided a novel type of coupling for use in helical pumps of the type which comprise a single rotor coacting with and eccentrically rotating in relation to a fixed stator, the novel coupling comprising an intermediate connector member which bridges the input and output members of the coupling to transmit torque, and only torque, therebetween, the connector member being especially adapted to permit the use of various arbitrary means for absorbing axial forces occurring in the coupling.

---

The present invention relates to screw pumps of the type provided with a single rotor coacting with a fixed stator, and more specifically to a pump of this specification in which there is used a novel coupling device between the rotor and the drive shaft of the pump.

A pump of the type specified is found described in U.S. Pat. No. 3,208,391, and in which an external single lead screw thread rotates under concurrent eccentric movement in a stationary stator housing provided with a double lead screw thread which coacts with the screw, and the pitch of which is twice as large as that of the rotor thread. The stator thread is made of a resilient material, generally rubber, and closed pockets are defined between the two pump members, these pockets moving continuously, axially through the pump in a smooth and nonsurging manner. Because the rotor moves through an eccentric orbit as it rotates, driving of the pump must be effected through the intermediary of a universal joint, whereby normally a short intermediate shaft having universal joints mounted at each end thereof is placed between the rotor and the driving shaft.

The relatively high loads which such universal joint devices have to withstand in helical pumps of the type specified cause the devices to constitute a critical component with regard to their mechanical strength. The torque to be transmitted is relatively high in relation to the space at the disposal of the universal joints, and therewith the size of the swivel pins around which said joints rotate. Furthermore, the restricted space at disposal does not permit the use of "genuine" universal joints, i.e., joints which each include two perpendicularly confronting shafts or trunnions mounted in slide bearings, but that in the majority of cases only one transversely extending trunnion is present in each joint, i.e., at each end of the intermediate shaft, wherewith in addition to a relative rotary movement the trunnion must also perform a sliding movement while transmitting torque. This sliding action and accompanying friction causes heavy wear on the trunnions, which are also subjected to high bending forces and shear stresses caused by the torque.

These circumstances mean that normally it is the universal joints employed in the pump which determine the periodicity of operational inspections, the periods between inspections being shorter than is actually warranted by the remaining pump components. Consequently, a screw pump operating with an eccentrically rotating rotor provided with a superior and hard wearing universal joint would constitute a valuable technical and economic advance in the art. The object of the invention is therefore to provide such an improved screw pump by replacing the present universal joint with a radially movable rotor coupling, more specifically a so-called cross slide coupling adapted for the purpose. A robust and hard wearing screw pump of the type described is provided, and the aforementioned disadvantages associated with pumps fitted with universal joints are eliminated by means of the invention as characterized in the claims.

The invention will now be described in detail with reference to a number of embodiments thereof shown in the accompanying drawings.

FIG. 3 is a perspective view of a known cross slide coupling, a so-called Oldham coupling, in which the parts are shown out of engagement.

FIG. 4 is a side view of an embodiment of the cross slide coupling used in the pump of the invention.

FIG. 5 is a section through the line V—V in FIG. 4.

FIG. 6 is a side view, partly in section, of the exploded coupling shown in FIGS. 4 and 5.

FIG. 13 is a longitudinal section through a screw pump according to the invention, in which the axial force on the pump rotor is taken up by a reaction rod.

FIG. 14 is a longitudinal section through a cross slide coupling corresponding to FIG. 8 but having means for taking up axial pressure forces instead of tension forces.

FIG. 15 is a cross section along the line XV—XV in FIG. 14.

Figure 1:
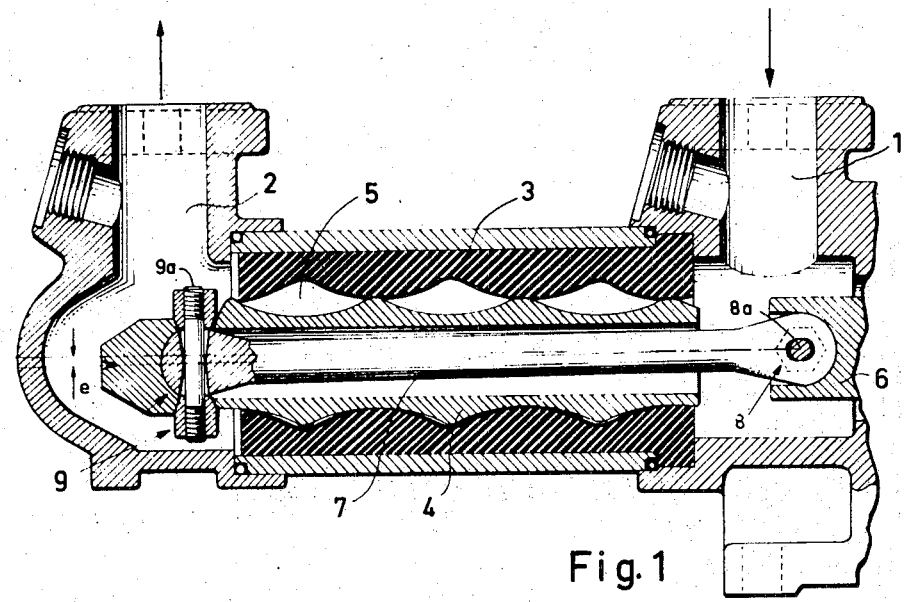
FIG. 1 shows a longitudinal section through a screw pump fitted with a conventional universal joint arrangement between driving shaft and pump rotor.

The pump shown in FIG. 1 is provided with conventional universal joints and presents an inlet 1 and an outlet 2, between which is arranged a stationary, resilient stator 3 which accommodates a helical rotor 4. The stator defines a pump chamber 5 and, as previously mentioned, the inside of the stator has the form of an internal, two lead screw thread, while the pump rotor is provided with an external single lead screw thread whose pitch is half that of the rotor thread. A more detailed description of this pump is given in the aforementioned U.S. Pat. No. 3,208,391. The pump rotor is rotated by an input drive shaft 6 whose axis of rotation simultaneously follows an eccentric orbit along a circular path of radius $e$. Thus, in order to translate the drive from the input shaft 6 to the rotor 4 a swivel connection must be arranged between said members, in the exemplary embodiment an intermediate shaft 7 having ball-and-socket joints 8 and 9 fitted at the ends thereof extend through the hollow rotor 4 and connects the end thereof situated adjacent the outlet 2 with the driving shaft 6. The ball-and-socket joints include transversely extending trunnions 8a and 9a, which extend through openings in the ends of the intermediate shaft 7, and some indication of the problems of mechanical strength mentioned in the preamble can be obtained from FIG. 1, since the narrow space compels torque to be translated via relatively slender and weak trunnions, which give short lever arms and are subjected to high shear stresses and high surface pressure along their line of contact with the walls of the openings in the intermediate shaft, which openings must of necessity permit slight deviations from center of the trunnions. Despite the fact that in this case the axial forces acting on the rotor exert pressure on the intermediate shaft 7 the resulting loads are high because the inlet, i.e., the suction side of the pump, is positioned on the drive side, this pressure is taken up by the ball joint ends of the shaft 7, and does not affect the trunnions 8a and 9a.

Figure 2:
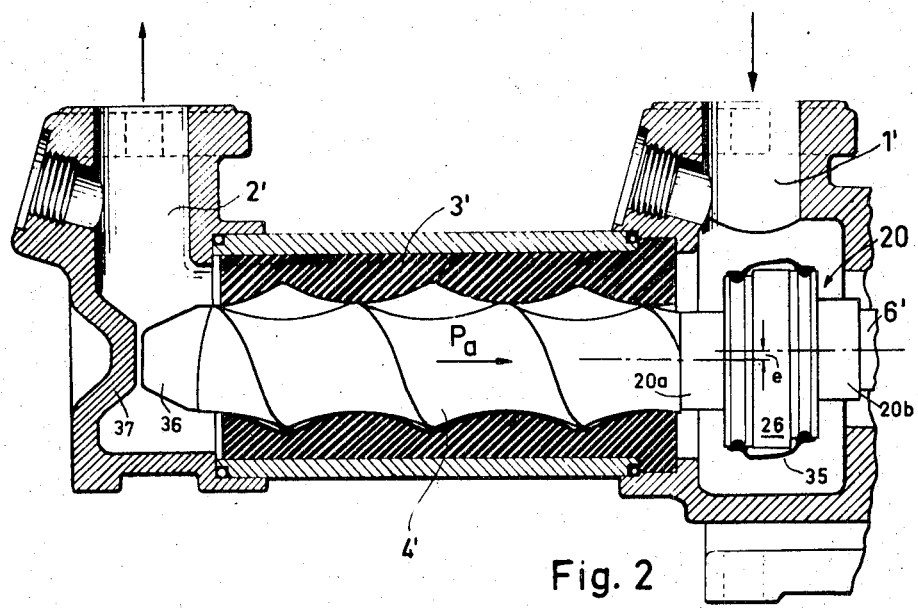
FIG. 2 shows the same pump modified in accordance with the invention, the universal joint being replaced by a cross slide coupling.

The load pattern is completely different and much more advantageous if the pump is instead provided with load transmission means according to the invention. FIG. 2 shows the same pump as FIG. 1, having an inlet 1' and an outlet 2' and stator and rotor 3' and 4' respectively. In this embodiment, however, there is no intermediate shaft, and the pump rotor 4' is connected directly to the input shaft 6' via a special designed cross slide coupling 20, to be described below, which transmit torque to the pump rotor 4' without being subjected to high loads conjointly as it permits the eccentric movement of the rotor of radius $e$.

To facilitate understanding of the invention, a brief description will be given of the classic cross slide coupling or Oldham coupling with reference to FIG. 3, which shows an exploded view of a coupling 10. This type of coupling is intended to transmit rotary movement between two parallel, mutually offset shafts which are each provided for the purpose at their confronting ends with like coupling members 11a and 11b respectively, these members in turn presenting a flange portion 12 and a hub portion 13 for connection to the shaft. Each flange portion is provided with a diametrical groove 14 and when assembling the coupling the shafts are aligned so that the opposing grooves 14a and 14b are at right angles to each other. A circular slide 16, provided with two diametrical keys 18a and 18b, one on either side thereof and positioned to form right angles to each other, is inserted between the coupling members 11a and 11b, in doing which the keys 18a, 18b are intended to be received in respective grooves 14a, 14b in the coupling members, as shown in FIG. 3 which illustrates the position of the members prior to assembly. The slide 16 will thus transmit rotary movement between the shafts and if said shafts rotate with a certain degree of mutual eccentricity the slide will at every moment adjust its position to that of the shafts while maintaining the same relative angular position therebetween by sliding along its keys in the grooves in the coupling members. The locations of the keys and grooves may be reversed, i.e., the grooves may be arranged in the slide 16 while the keys are arranged in the coupling members 11.

This type of shaft coupling is used exclusively to transmit torque since, as will be readily understood, it is incapable of transmitting axial forces in a technically acceptable manner unless special measures are taken. Because a helical pump rotor is subjected to relatively large axial forces, either tension or compression forces, depending on the position of the pump inlet and outlet in relation to the driving side, the cross slide coupling or its environment must be modified so that the axial forces are taken up in an optimum manner. An embodiment of a cross slide coupling which takes up axial forces is illustrated in FIGS. 4–6. In this embodiment the aforementioned grooves are disposed in the central slide and the keys on embracing coupling members. The modified cross slide coupling 20 consists of coupling members 21a and 21b provided with flange portions 22a, 22b (FIG. 6) and hub portions 23a, 23b for connection to the pump rotor 4' and the end of the driving shaft 6', as shown in FIG. 2. The keys 24a, 24b arranged on the flange portions are divided into two parts 24a' and 24a'', and 24b' and 24b'' respectively. These are accommodated in bottom grooves 28a' and 28a'', and 28b' and 28b'' respectively, disposed in the intermediate slide or, rather the intermediate coupling connector 26, the pair of grooves 28a being arranged perpendicular to the pair of grooves 28b.

In addition to the keys 24 of the coupling members 21, there are also arranged in the connector 26 four balls 30, made of stainless steel for instance, accommodated in through-passing circular openings 32 in the connector 26, between the pair of keys 28 (FIG. 5). The connector 26 is suitably made of structural plastic having a low coefficient of friction, e.g., nylon. The diameter of balls 30 is somewhat larger than the thickness or width of the connector 26, and thus when the coupling members are brought together with the connector positioned therebetween, the balls will contact the flange portions 22 at the side of the keys 24. Suitably hardened pads or plates 34 are recessed into the flange portions 22 at the points of contact with the balls. These pads can be omitted, however, if the material of the flanges is itself sufficiently hard to withstand the pressure exerted by the balls.

FIGS. 4 and 5 show the cross slide coupling when assembled, and FIG. 4 shows how the two coupling members 21a and 21b are offset by a distance $e$ in parallel relationship to each other. Located between the coupling members is the connector 26, which forms a means for transmitting torque between the mutually perpendicular keys 24a and 24b of the coupling members 21. Since the keys rotate around circular orbits whose centers are displaced by the distance $e$ the connector is constantly forced to adjust itself to the constantly alternating relative positions of the keys, by permitting parts 24a', 24a'' and 24b', 24b'' to slide in corresponding connector grooves 28a', 28a'' and 28b', 28b'' respectively. As mentioned above, the connector 26 is not subjected to axial pressure because the diameter of the balls 30 exceeds the width of the connector and thus any axial pressure is transmitted directly between the coupling members 21 via the balls, and the connector lies free with an axial clearance between said coupling members. As mentioned earlier, contact of the balls 30 with the coupling members is effected through the intermediary of hardened pads inserted therein.

Because of the eccentric rotation, every point on one coupling member 21a or 21b will describe a circle of diameter $2e$ in relation to any other point on the other coupling member. Upon considering the plane through the opposing sides of the flange portions 22 it will be noted that the eccentric movement of the aforementioned points in said plane indicate that the intermediate balls 30 describe a small circular path of diameter $e$ (the balls adopt a constant mean position between the coupling members). It follows from this that the diameter of openings 32 must be at least equal to the diameter of the ball plus distance $e$, which constitutes a starting point when dimensioning the coupling. FIG. 5 illustrates an example of the dimensions and relative orientation of the coupling components.

Naturally, the cross slide coupling can be constructed so that the keys are located on the central slide or connector and the grooves in the coupling members essentially in accordance with FIG. 3. In this instance the slide 16 is provided within four quadrants between the keys 18a and 18b with openings accommodating ball bearings, essentially as aforedescribed. In certain instances sliding of the components in the cross, i.e., sliding of the keys in the perpendicularly crossing grooves, irrespective of whether they are located in the slide or in the coupling members, can be replaced by a rolling action, by inserting suitable rollers between the keys and the walls of the grooves.

As illustrated in FIG. 2, the cross slide coupling 20 is connected between the input drive shaft 6' and the pump rotor 4', these members being connected to respective coupling members 21a and 21b and space being defined for the coupling outside the stator housing on the suction side of the pump. A comparison between FIGS. 1 and 2 shows that the novel coupling does not cause any appreciable increase in the dimensions of the pump, since its outer diameter is well within the outer diameter of the resilient stator, and its axial width is very moderate. The torque transmitting and pressure absorbing slide surfaces between grooves and keys in the coupling are relatively large, and lie at such a radial distance from the axis of rotation that the torque is transmitted over relatively large lever arms, thus contributing toward low loads on the coupling.

In order to protect the interior of the coupling 20, the flange portions 22a and 22b are suitably provided with grooves which accommodate the edge portions of a sleeve 35, which forms a protective casing about the movable connector 26. The protective sleeve may be fully sealing and made of some elastic material, such as natural or synthetic rubber, wherein the interior of the coupling is fully isolated from the surroundings and can accommodate an appropriate lubricant. When the connector 26 is made of nylon and the pump is intended to pump aqueous media, the sleeve, since water is the best lubricant for nylon, may be made of a fine mesh net material or be in the form of a water permeable diaphragm structure, to permit water to enter the coupling but excluding other substances, such as sludge, present in the pumped medium. The sleeve may also be attached to the coupling members in a different manner, e.g., by clamping devices. As is clearly evident from the aforegoing, the cross slide coupling 20 only absorbs axial forces in one direction, namely in the direction in which the pressure is exerted. Since the inlet of the pump shown in FIG. 2, that is the suction side, is located on the drive side, whereas the pressure side is located on the outlet side, the pump rotor 4' is urged during operation to the right as viewed in FIG. 2 by a force $P_a$ and thus subjects the coupling 20 to a pressure force. Upon reversals of the direction of the axial pressure $P_a$, e.g., upon positional changes during inactivity of the pump, the rotor 4' is prevented from being drawn out of the coupling 20 by virtue of a support or backing surface 36 located to the left of the coupling 20 opposite a shoulder 37 in the pump housing. There is normally a constant clearance between the members 36 and 37, although this space is so small that the rotor can under no circumstances be unintentionally moved out of engagement with the coupling.

Figure 7:
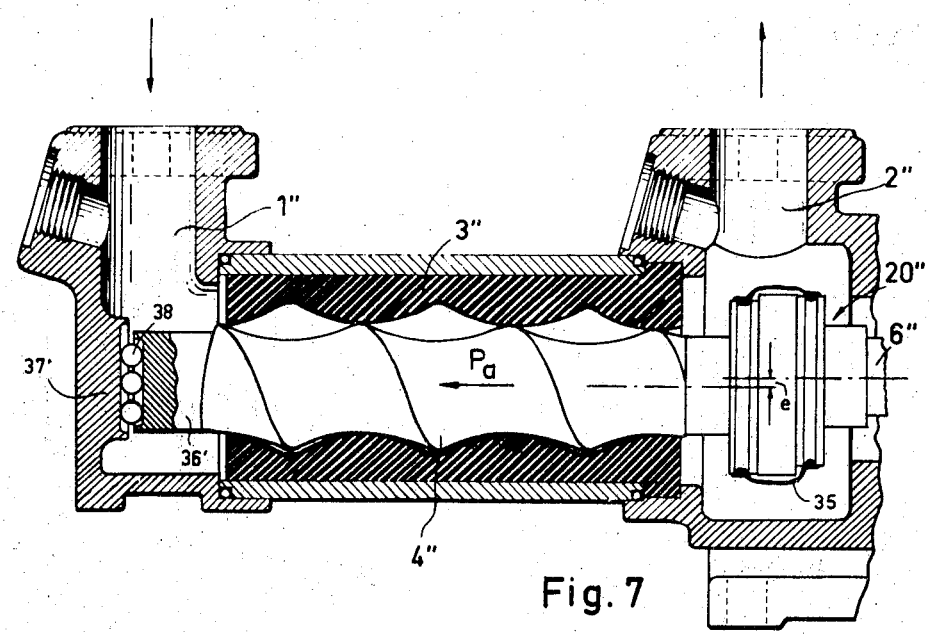
FIG. 7 is a view corresponding to FIG. 2 of a pump according to the invention in which the positions of the pump inlet and outlet are reversed, and thus also the direction of the axial forces acting on the pump rotor, which is of consequence to the coupling.
Figure 8:
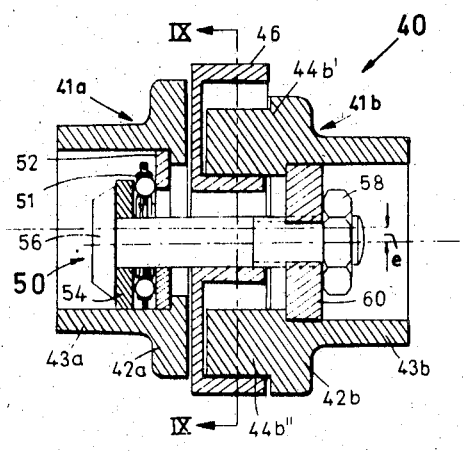
FIG. 8 is a longitudinal section through a modified cross slide coupling in a pump according to the invention and adapted to take up axial tension forces.
Figure 9:
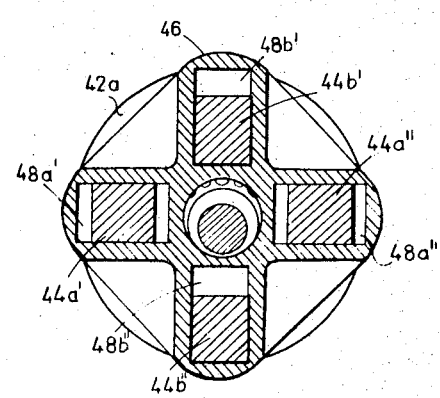
FIG. 9 is a cross section through the line IX—IX in FIG. 8.

If for certain reasons, e.g., occasioned by the environmental conditions of the packing boxes at the bushing or lead-in of the drive shaft, the pressure side of the pump is located on the drive side, for instance as the pump in FIG. 7 whose inlet and outlet 1" and 2" respectively are reversed in relation to the pump of FIG. 2, the pump rotor 4" accommodated in the stator 3" will be forced to the left as seen in FIG. 7, the coupling 20 then being subjected to tension forces which is not possible unless extraneous measures are taken. The resulting axial force $P_a$ can, however, in this instance be absorbed by a special axial bearing arranged on the left of the pump rotor 4", where the end 36' of the rotor is provided with a rolling surface for a set of balls 38, while a corresponding shoulder 37' on the pump housing is provided with a corresponding roller surface. Thus, the previously described balls 30 accommodated in the coupling 20 have in principle been moved to the left on the pump rotor, and the coupling between driving shaft and pump rotor is without balls or axial force absorbing means in this case. However, the cross slide coupling itself can be designed to take up axial tension forces and an example of such a coupling 40 is illustrated in FIGS. 8 and 9. Similarly to the aforedescribed embodiments, the modified coupling 40 comprises three main parts, namely two coupling members 41a, 41b and an intermediate slide or connector 46. As before, the latter is provided with four grooves or recesses 48, of which two, 48' and 48", are turned to confront the coupling member 41a, and accommodate keys 44a' and 44a" respectively projecting therefrom, while the remaining groove 48b' and 48b", extending at right angles to the first-mentioned grooves, face toward the coupling member 41b and accommodate its keys 44b' and 44b". In this instance no bearing balls are provided in the connector 46 (provided that the coupling is not intended to take up both compression and tension forces), and the connector 46 can thus be constructed as illustrated in FIG. 9. In this embodiment, a tension force absorbing unit 50 is arranged in the central portion of the coupling, see FIG. 8.

As will be seen from FIG. 8, the hub portions 43a, 43b of the mutually like coupling members 41a and 41b are provided with internal shoulder surfaces, against which a smooth ground, hardened pad 52 and a threaded pad 60 respectively are arranged essentially radially within the flange portion 42a and 42b of the coupling members. The coupling members are held together via the pads against axial tension forces by means of bolt 56 which extends through a central opening in the connector 46 and is screwed into the pad 60 and locked therein with a lock nut 58. Positioned beneath the head of the bolt 56 is a smooth ground, hardened plate 54 and between said plate and the pad 52 is positioned an axial force absorbing ball ring or race 51 accommodated in a holder, whereby the bolt 56 and also the coupling member 41b can rotate freely radially, within the limits determined by the clearance of the bolt in the openings in the pad 52 and the connector 46, in relation to the coupling member 41a while holding the coupling members together and transmitting axial tension forces between said members and the shafts connected thereto, i.e., the input drive shaft on one side of the pump and the pump rotor on the other. Torque is transmitted over the connector in the manner aforedescribed.

Figure 10:
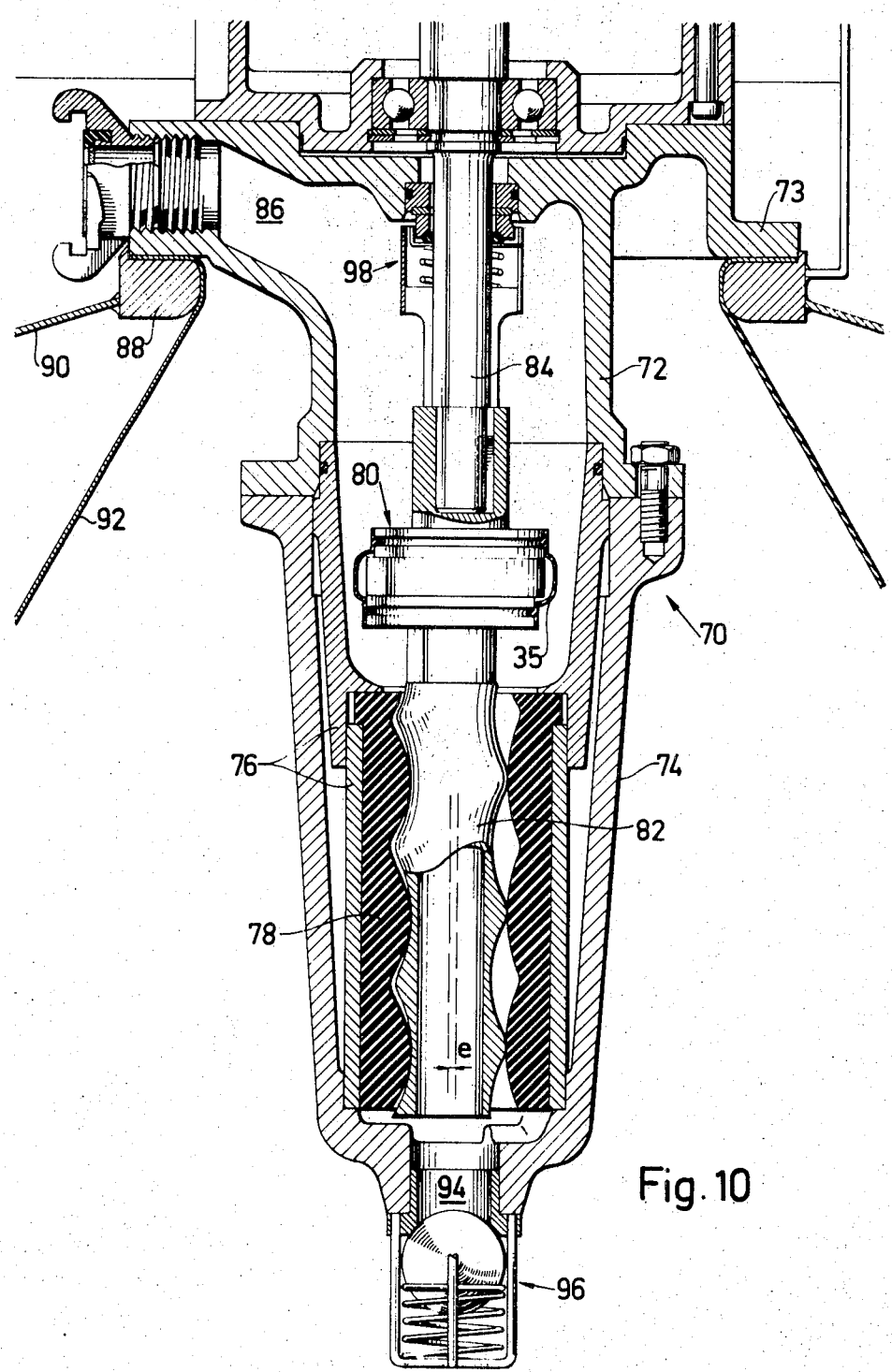
FIG. 10 is a longitudinal section through a screw pump according to the invention, suspended vertically for assembly in a liquid elevator, so called hydrophore.

FIG. 10 illustrates an example of how a pump according to the invention can be constructed for vertical suspension in, for instance, a hydrophore. In brief, the figure shows a hydrophore pump 17 having an upper and lower housing portion 72 and 74, in which a divided lining 76 is positioned which in turn accommodates the resilient stator 78 of the pump, the stator being secured between the parts of the lining as shown in FIG. 10. The eccentrically rotating hollow pump rotor 82 is mounted in a known manner in the stator 78 and connected to the input drive shaft 84 via a cross slide coupling 80 in accordance with the coupling 20 shown in FIGS. 4–6, the various connections being adapted in an appropriate manner. The upper housing 72 is provided with an inlet 86 and an attachment flange 73, by means of which the housing portion is anchored to a flange 88 surrounding an upper opening of a hydrophore vessel 90. The water pumped into the vessel is suitably accommodated in an elastic bag 92, for instance, made of rubber, the edge of the bag being secured along the opening between the flanges 73 and 88 of the upper housing portion and the hydrophore vessel respectively, as shown in the figure. The outlet, which thus forms the pressure side of the pump, is provided with a non-return valve unit 96, including a spring biased plastic or rubber ball, to maintain the pressure in the vessel 90 when the pump is stationary in accordance with the principle of a hydrophore. Arranged at the lead-in or bushing of the drive shaft 84 in the upper housing portion 72 is a conventional shaft seal 98. For instance a rotary plane seal of the carbon ring type. The lower housing portion 74 is provided, opposite the lower end of the pump rotor 82, with a number of fixed support ribs, corresponding to the shoulder 36b in the pump shown in FIG. 2, to support the pump rotor in the event that it falls when the pump is stationary, the pump rotor not being securely suspended axially in the coupling 80. At the top of FIG. 10 are also shown ball bearings and other details forming part of the conventional connection of the pump to a drive motor.

The hydrophore pump illustrated in FIG. 10, and to which the principles of the invention have been applied, forms, a particularly robust and effectively operating pump unit, presenting linear, uncomplicated through flow and in which the rotating masses of the pump are mutually collected coaxially and with small radial extension. There are no load concentrations or sliding friction with high surface pressure.

In all helical pumps of the described type in which the pump rotor during rotation about its own axis simultaneously effects an eccentric movement, the position of the rotor in the stator at any moment is determined by the mutual engagement between the stator and rotor threads. In principle the axes of the two threads are parallel, which means that the rotor shaft during its eccentric movement or circuitary movement about the axis of the stator should be constantly parallel therewith. In view of the resiliency of the stator and variations in pressure and deviations within predetermined tolerance limits from the exact shape of the stator and the rotor, it is possible in practice that the roor shaft will precess somewhat, i.e., small deviations from the parallelism of the shafts take place during rotation. In view of this, the connection between the rotor and the shaft should not be such that the rotor is subjected to a "directioning" effect, but is permitted freely to adapt itself to the attiude of the stator. Since, for instance, the coupling 20 takes up the axial pressure from the rotor 4' at four points spaced about the rotor shaft (the balls 30) a small amount of precession of the rotor shaft may cause the balls to be subjected to an alternating pressure during rotation. Since any precession can, in most cases, be estimated as relatively insignificant, and at least substantially equal distribution of the axial forces on the balls can, however, be obtained by making the contact surfaces thereof in the coupling members, i.e., the surfaces on the hardened pads 34, resilient, by providing the pads with a resilient foundation, i.e., in the form of a plate 34a made of relatively hard rubber, see FIG. 6.

Figure 11:
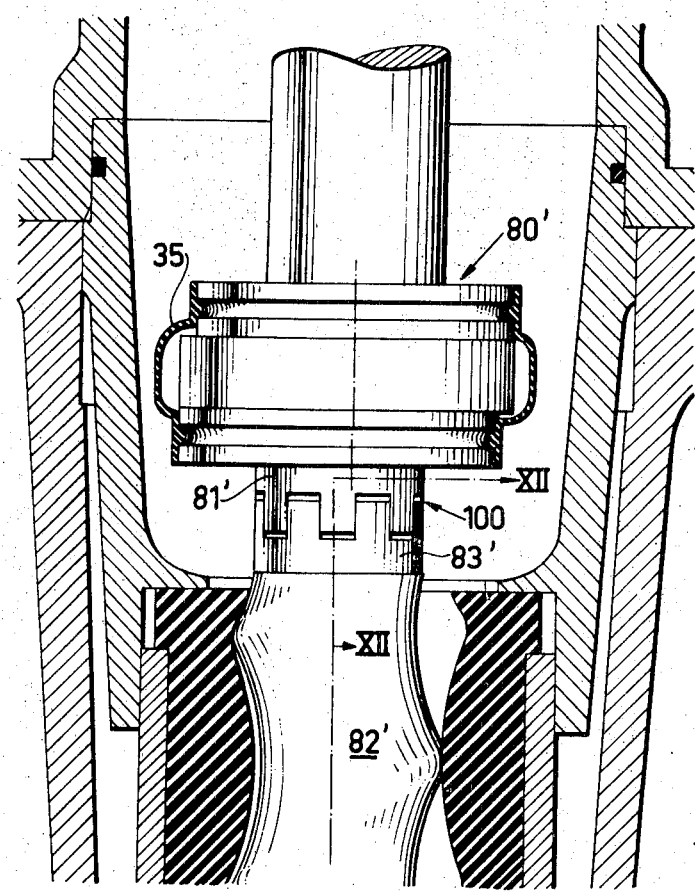
FIG. 11 shows, slightly enlarged, a part of the pump shown in FIG. 10 having a modified connection between the cross slide coupling and the pump rotor.
Figure 12A:
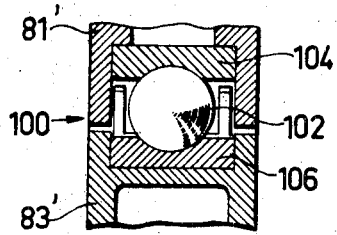
FIGS. 12a and 12b show cross sections through the line XII—XII in FIG. 11.
Figure 12B:
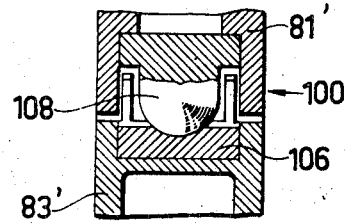

Additional assurance that the pump rotor and the coupling are not subject to undue bending forces is obtained by the connection therebetween conrstucted as shown in FIGS. 11 and 12, the hydrophore pump of FIG. 10 being chosen as an example. In this instance, the output hub 81' of the cross slide coupling 80' (see FIG. 11) is connected with the inlet end 83' of the pump rotor 82 by means of a claw coupling 100, which transmits the torque while permitting any unaccountable precession or tilting movement of the rotor which may occur. The axial pressure is transmitted suitably over a central ball support 102, e.g., as FIG. 12a shows. In this instance a stainless stell ball 102 is inserted between the plates 104 and 106, which are provided with a ball seating and abut against abutment surfaces in the coupling hub 81' and the end of the rotor 83' respectively. Since axial forces are in this way guided centrally in the coupling 80' the four axial force absorbing balls therein are subjected to equal loads while concurrently permitting any precession movements which might take place. The same effect can be obtained in the modified arrangement of FIG. 12b, in which the bolt 102 and the plate 104 are replaced with or jointed to an abutment stud 108 provided with a semispherical end which is accommodated in the seating of the opposing plate 106.

In all the embodiments of the invention hitherto described it has been presumed that the axial forces occurring on the pump rotor are taken up and transmitted to the surroundings via some form of roller bearing, either in the actual cross slide coupling or located outside the same. It should be emphasized, however, that it is within the scope of the present invention to utilize slide bearings for the purpose of transmitting this force. Admittedly, roller bearings are to be preferred in most instances since radial movement of the coupling members should not be prevented by slide friction over above that which occurs between the keys and grooves of the couplings. In the case of smaller pumps with low axial forces, however, this extra slide friction can be reduced to insignificant levels, particularly if modern low frictional material is used in the slide surfaces. Consequently, the balls 30 in the coupling 20 (see FIGS. 4-6) can be replaced in a manner obvious to one skilled in the art by mutually contacting studs extending from the coupling members 2a, 2b, the ends of which studs slide against each other.

It is possible, however, to take up axial forces acting on the pump rotor in the slide bearings with practically negligible friction losses by any simple means. FIG. 13 illustrates one embodiment of such means. The embodiment is shown in connection with a conventional screw pump, shown in FIG. 1 and described in the introduction. The primary desire in this pump is to omit the universal joints 8 and 9 at the ends of the intermediate shaft 7, the axial force absorbing members in this embodiment comprise ball-socket-joints at the ends of said shaft. FIG. 13 thus illustrates a helical pump which essentially coincides with the pump illustrated in FIG. 1 and which is provided with an inlet and outlet 1''' and 2''' respectively, the former being located on the drive side, and a stator 3''' and a hollow rotor 4'''. The latter accommodates a simplified intermediate shaft 7''' which in fact forms a simple impact rod provided with ball-shaped ends accommodated in corresponding spherical cup-shaped seatings in the closed end of the rotor and the driving coupling member of the coupling 20'''. In view of the small eccentric movement in relation to the length of the intermediate shaft the amount of slide is very insignificant as is also the effect of developed friction on the sliding movement in the actual coupling.

Finally an example is given as to how the cross slide coupling of the screw pump can be provided with a central axial pressure absorbing unit having slide bearings (see FIGS. 14 and 15). This coupling 120 is analogous with the coupling 40 shown in FIGS. 8 and 9, although in the exemplary embodiment the tension force absorbing unit 50 is replaced with a pressure force absorbing unit, indicated by reference 130. The torque transmitting parts of the coupling are essentially the same as those of the coupling 50, and will not be described. The connector 126, however, is provided with somewhat widened openings and the mutually like coupling members 121a and 121b have smaller openings, which form seatings for the members of the pressure force absorbing unit 130. These members are three in number, namely one plain bearing pin 132 accommodated in, for instance, coupling member 121b, one ball-socket-joint pin 134 accommodated in coupling member 121a, and one plain bearing member 136 arranged between said pins. The opposing surface of members 132 and 136 are lined with an appropriate low friction material and slide against each other, to transmit the axial force. The opposite side or end 138 of the plain bearing member 136 is semi-spherical in shape and is accommodated in a corresponding seating in the ball-socket-joint pin 134, to permit, similarly with the ball supports 102 and 108 shown with reference to FIGS. 12a and 12b, any small deviations or precession movements of the rotor.

For the sake of completeness it would be mentioned that the axial pressure absorbing slide bearing unit 130 of the last-mentioned coupling 120 may be easily converted to a ball bearing unit, by placing a ball ring between the opposing surfaces of the plain bearing pin 132 and the plain bearing member 136, said surfaces being suitably modified for the purpose, for instance analogously with the axial ball bearings shown to the left of FIG. 7.

The invention is naturally not restricted to the shown embodiments, but can be varied within the scope of the inventive idea.

The embodiments of the invention in which an exclusive property or privilege is claimed are defined as follows:

1. A screw pump comprising:

elongated hollow stator means;

housing means mounting said stator means and having an inlet and outlet communicating with the opposite ends of said hollow stator means;

an elongated rotor means disposed within and mounted for rotation relative to said stator means, said rotor means and said stator means having cooperating helical threads which are so related that rotation of the rotor means within the stator means causes the rotor means to move on an orbital path, and the cooperating helical threads coacting to create a pumping action;

drive means connectible to said rotor means for causing rotation thereof, said drive means including a rotatable drive shaft having one end thereof disposed adjacent one end of said rotor means;

torque transmittible coupling coupling means connected between said drive shaft and said rotor means and including a first coupling member nonrotatably connected to said one end of said drive shaft, a second coupling member nonrotatably connected to said one end of said rotor means, an intermediate radially movable slide member disposed between said first and second coupling members, and first key-and-groove means cooperating between said first coupling member and said intermediate coupling member and second key-and-groove means cooperating between said intermediate coupling member and said second coupling member for transmitting torque between said first and second coupling members, said first and second key-and-groove means being arranged substantially at right angles to one another; and thrust transmitting means coacting between said rotor means and said drive shaft for enabling an axial thrust force imposed on said rotor means to be transmitted to said drive shaft without said thrust force being imposed on said intermediate coupling member, said thrust transmitting means including an elongated rigid thrust transmitting member having one end thereof disposed in bearing engagement with said rotor means adjacent the other end thereof, and the other end of said thrust transmitting member being disposed in engagement with said drive shaft or said first coupling member for permitting the axial thrust force imposed on said rotor means to be transmitted to said drive shaft without being transmitted through said intermediate coupling member.

2. A screw pump according to claim 1, wherein the opposite ends of said thrust transmitting member are provided with partial spherical bearing portions for enabling said rotor means to move in an orbital path relative to said drive shaft.

3. A screw pump according to claim 1, wherein said elongated rotor means is substantially hollow and is provided with a bearing seat adjacent said other end thereof, said elongated thrust transmitting member being disposed within and extending longitudinally of said hollow rotor means with said one end of said thrust transmitting member being disposed in bearing engagement with said bearing seat.

4. A screw pump according to claim 3, wherein said stator means is constructed to a resilient material.

5. A screw pump according to claim 3, wherein said inlet communicates with said hollow stator means adjacent said one end of said rotor means, and said outlet communicates with said hollow stator means adjacent said other end of said rotor means.

6. A screw pump according to claim 5, wherein the opposite ends of the thrust transmitting member are ball-shaped or partly spherical shaped for enabling said elongated thrust transmitting member to swing or oscillate during the orbital or eccentric rotation of the rotor means relative to said drive shaft.

7. The screw pump of claim 1, in which the coupling means is surrounded by a protective covering which extends between the ends of the coupling and is appropriately attached in the coupling members.

8. The screw pump of claim 7, in which the protective covering is made of rubber or plastic material or some other sealing material and is arranged completely sealing around the coupling.

9. The screw pump of claim 7, in which the protective covering is made of a pervious, filtering material which permits the pumped medium to pass therethrough but which excludes solid substances and impurities.

References Cited

FOREIGN PATENTS 613,788  12/1948  Great Britain _____ 103—117M

CARLTON R. CROYLE, Primary Examiner

J. J. VRABLIK, Assistant Examiner

U.S. Cl. X.R.

418—179, 287—130